United States Patent Office 3,193,556
Patented July 6, 1965

3,193,556
BIS(QUATERNARY AMMONIUM) SALTS OF S-OCTAHYDROANTHRACENE
Marjan Kolobielski, Pittsburgh, Pa., assignor to United States Steel Corporation, a corporation of New Jersey
No Drawing. Filed Dec. 28, 1961, Ser. No. 162,958
7 Claims. (Cl. 260—296)

This invention relates to novel bis(quaternary ammonium) salts of s-octahydroanthracene which are bacteriologically active and have good germicidal properties.

The need for germicides possessing high bacteriological activity has long been recognized. Useful germicides must possess many special properties. The material should be water soluble and non-hygroscopic. Germicides are normally employed in aqueous systems, but at the same time they should not readily pick up moisture during storage and shipment. A germicide must also have high bacteriological activity and, for safety reasons, it should be non-irritating to the skin and eyes. Furthermore, to be commercially practicable, a germicide should be easily prepared from readily available and comparatively inexpensive raw materials.

There are some commercial germicides of the quaternary ammonium type which possesses the above-mentioned useful properties. The most widely used are quaternary ammonium germicides based on alkyl dimethyl benzyl ammonium chloride. However, as far as I am ware, germicides are unknown having two quaternary ammonium groups in their molecule and based on readily available derivatives of polycyclic aromatic compounds such as partially hydrogenated anthracene. I have now found that bis(quaternary ammonium) salts of s-octahydroanthracene possess all of the desirable properties of germicides. My novel compounds are bis(quaternary ammonium chlorides) of s-octahydroanthrancene having the structural formula:

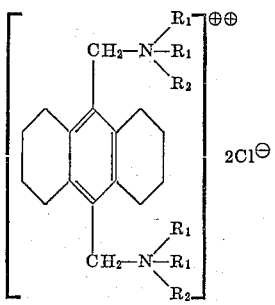

wherein $R_1$ is methyl, $R_2$ is chosen from the group consisting of methyl, decyl, dodecyl, tetradecyl and a mixture of alkyl radicals derived from coconut-oil fatty acids when taken separately and when taken together, the $R_1$, $R_1$ and $R_2$ radicals contain the carbon and hydrogen atoms necessary to form a pyridine nucleus, of which the nitrogen is a member.

In practice, the new compounds are produced by heating together for several hours in a liquid system, 9,10-bis-(chloromethyl)-s-octahydroanthracene and an appropriate tertiary amine chosen from the group consisting of trimethylamine, pyridine, N-dimethyl decyl amine, N-dimethyl dodecyl amine, N-dimethyl tetradecyl amine and N-dimethyl n-alkyl amine where "n-alkyl" represents a mixture of alkyl radicals derived from coconut-oil fatty acids. It is specifically intended to include within the scope of this invention the pyridinium compound in which three of the alkyl radicals on the N atom are joined and together with the nitrogen atom to which they are attached form a pyridine nucleus. The liquid system may comprise solvents such as methyl and ethyl alcohols, dioxane, benzene, or water. The reaction temperature corresponds to the boiling point of the lowest-boiling component of the reaction mixture. After the reaction is completed, the product and solvent are separated by filtration or by evaporating the solvent under reduced pressure.

Among the hereinabove described representative tertiary amines the N-dimethyl n-alkyl amine is represented by "Armeen DMCD" a trademark of Armour Industrial Chemical Company, Division of Armour and Company, for a mixture of tertiary amines derived from coconut-oil fatty acids. This product has a molecular weight between about 224 and 244. Included in its mixture are N-dimethyl decyl amine, N-dimethyl dodecyl amine and N-dimethyl tetradecyl amine.

The novel bis(quaternary ammonium chloride) compounds are effective and useful germicides. They possess great activity against such bacteria as *Escherichia coli* and *Staphylococcus aureus* and such fungi as *Fusarium oxysporum*, Penicillium species, *Aspergillus flavus*, and *Aspergillus niger*.

A complete understanding of the invention may be obtained from the following typical examples of process showing how the compounds are made and used.

EXAMPLE 1

A mixture consisting of 28.3 g. (0.1 mole) of 9,10-bis-(chloromethyl)-s-octahydroanthracene and 200 cc. of a 25 percent solution of trimethylamine in methyl alcohol was stirred and heated at reflux temperature (about 65° C.) for 4 hours. After cooling, the methyl alcohol was evaporated under vacuum. The residual solid, after washing with ether and drying, yielded 38.4 g. (96%) of the colorless s-octahydroanthracene-9,10-bis(methyl trimethyl ammonium)dichloride.

EXAMPLE 2

In a one-liter three-neck flask fitted with a mechanical stirrer and a reflux condenser were placed 28.3 g. (0.1 mole) of 9,10-bis(chloromethyl)-s-octahydroanthracene, 700 cc. of water, and 50 g. of N-dimethyl n-alkyl amine as "Armeen DMCD". The mixture was stirred and heated under reflux at about 100° C. for 6.5 hours. The solution was then concentrated by eliminating water at 50° C. and 30 mm. of mercury pressure. The residual syrupy product yielded 69.9 g. (96% yield) of s-octahydroanthracene-9,10-bis(methyl dimethyl-n-alkyl ammonium)dichloride.

EXAMPLE 3

A mixture containing 28.3 g. (0.1 mole) of 9,10-bis-(chloromethyl)-s-octahydroanthracene, 30 cc. of pyridine, and 100 cc. of benzene was stirred and heated at reflux temperature for 4 hours. The precipitated solid was filtered, washed with ether, and dried to give 43.5 g. (98.5% yield) of the colorless s-octahydroanthracene-9,10-bis-(methyl pyridinium)dichloride.

The new bis(quaternary ammonium chlorides) of s-octahydroanthracene are very suitable for use as germicides. Their antibacterial and antifungal activities were determined by qualitative and quantitative tests. A liquid detergent sanitizer formulation was also prepared.

For the antibacterial qualitative tests of the compounds, nutrient agar plates were poured and incubated overnight at 37° C. to assure sterility. The plates were inoculated respectively with 16- and 24-hour broth cultures of the test microorganisms. A 0.01 gram quantity of a compound was placed on individual inoculated plates, all compounds being tested in sextuplicate. These plates were incubated at 37° C. for 24 hours. The germicidal afficiency of the compounds was indicated by areas around the samples where growth was inhibited. The size of such zones indicated the effectiveness of the compound against the test microorganism.

The antifungal activity of the compounds was determined by placing 0.01 grams thereof on plates of Sabouraud's dextrose agar previously streaked with a 5- to 7-day culture of the test fungus. All compounds were tested in sextuplicate for a three day incubation period at 23 C. The antibacterial and antifungal activity of the compounds is summarized in Table I.

*Table I*

|  | MTA | MDA | MP |
|---|---|---|---|
| Antibacterial Activity: |  |  |  |
|   *Escherichia coli* | ++ | +++ | ++ |
|   *Staphylococcus aureus* | +++ | ++ | +++ |
| Antifungal Activity: |  |  |  |
|   *Fusarium oxysporum* | 0 | +++ | 0 |
|   *Penicillium species* | 0 | +++ | 0 |
|   *Aspergillus flavus* | 0 | +++ | 0 |
|   *Aspergillus niger* | ++ | +++ | ++ |

Legend:
  MTA = s-Octahydroanthracene-9,10-bis(methyl trimethyl ammonium)dichloride.
  MDA = s-Octahydroanthracene-9,10-bis(methyl dimethyl-n-alkyl ammonium)dichloride.
  MP = s-Octahydroanthracene-9,10-bis(methyl pyridinium)-dichloride.
  0 = No inhibition.
  + = Slight inhibition.
  ++ = Fair inhibition.
  +++ = Good inhibition.

For the quantitative antibacterial test, aqueous solutions of the compounds were prepared in concentrations of 250, 1000, and 2000 parts per million (p.p.m.). Nutrient agar plates were inoculated by streaking them with a 16-hour culture of the test bacterium. Sterile filter-paper discs (12.7 mm. in diameter), saturated with the respective concentrations of the compounds, were placed on the inoculated plates. Three separate tests of each solution were made. The plates containing bacteria were incubated at 37° C. for 24 hours. At the end of the incubation period, the zones of inhibition were measured from the edge of the disc to the beginning of the growth. the size of such zones indicating the degree of antibacterial activity is summarized in Table II.

*Table II*

|  | Concentration of Aqueous Test Solution, p.p.m. | Bacterium: *Staphylococcus aureus* Zone of Inhibition, mm. |
|---|---|---|
| s-Octahydroanthracene-9,10-bis (methyl dimethyl-n-alkyl ammonium)dichloride. | 250<br>1,000<br>2,000 | 1.7<br>3.7<br>4.0 |
| s-Octahydroanthracene-9,10-bis (methyl pyridinium)-dichloride. | 250<br>1,000<br>2,000 | 0<br>1.0<br>2.0 |

A liquid detergent-sanitizer was prepared according to the following formulation:

| | Weight Percent |
|---|---|
| s-Octahydroanthracene-9,10-bis(methyl-dimethyl-n-alkyl ammonium)dichloride | 10 |
| "Surfonic N-95"[1] nonionic detergent | 10 |
| Trisodium phosphate | 3 |
| Water | 77 |

[1] "Surfonic N-95" is a trademark for a nonionic surface-active agent made by Jefferson Chemical Co., Inc., and composed of an alkyl aryl polyether alcohol.

A 20 g. sample of this composition dissolved in 10 liters of water provided a good cleaner with sanitizing and bactericidal properties for washing equipment in the dairy industry, restaurants, breweries and food-processing establishments.

While the above examples illustrate preferred methods for preparing my novel compounds, it is within the scope of invention to prepare separate compounds from the individual tertiary amines that are present in a mixture such as "Armeen DMCD." Thus it is possible to use the procedure outlined in Example 2 to prepare s-octahydroanthracene-9,10-bis(methyl dimethyl n-decyl ammonium)dichloride, s-octahydroanthracene-9,10-bis(methyl dimethyl n-dodecyl ammonium)dichloride, and s-octahydroanthracene-9,10-bis(methyl dimethyl n-tetradecyl ammonium)dichloride by reacting 9,10-bis(chloromethyl)-s-octahydroanthracene with the appropriate respective amines, namely, N-dimethyl decyl amine, N-dimethyl dodecyl amine, and N-dimethyl tetradecyl amine.

My novel compounds have a number of advantageous properties desirable for germicides. Among these may be mentioned especially that they are non-hygroscopic, water-soluble, and non-irritating to the user. They possess high bacteriological activity and may be easily prepared from relatively inexpensive raw materials. These compounds are also useful as cationic surface-active agents.

Although I have disclosed herein the preferred practice of my invention, I intend to cover as well any change or modification therein which may be made without departing from the spirit and scope of the invention.

I claim:

1. A bis(quaternary ammonium chloride) compound of the formula $$\left[ \begin{array}{c} CH_2-N\!\!\!\begin{array}{c}R_1\\R_1\\R_2\end{array} \\ \text{(octahydroanthracene)} \\ CH_2-N\!\!\!\begin{array}{c}R_1\\R_1\\R_2\end{array} \end{array} \right]^{\oplus\oplus} 2Cl^{\ominus}$$

wherein $R_1$ is methyl, $R_2$ is chosen from the group consisting of methyl, decyl, dodecyl, tetradecyl and a mixture of alkyl radicals derived from coconut-oil fatty acids when taken separately and when taken together, the $R_1$, $R_1$ and $R_2$ radicals when taken together with nitrogen are pyridine.

2. The compound s-octahydroanthracene-9,10-bis-(methyl trimethyl ammonium)dichloride.

3. The compound s-octahydroanthracene-9,10-bis-(methyl pyridinium)dichloride.

4. The compound s-octahydroanthracene-9,10-bis-(methyl dimethyl n-decyl ammonium)dichloride.

5. The compound s-octahydroanthracene-9,10-bis-(methyl dimethyl n-dodecyl ammonium)dichloride.

6. The compound s-octahydroanthracene-9,10-bis-(methyl dimethyl n-tetradecyl ammonium)dichloride.

7. The compound s-octahydroanthracene-9,10-bis-(methyl dimethyl n-alkyl ammonium)dichloride where "n-alkyl" represents a mixture of alkyl radicals derived from coconut-oil fatty acids.

No references cited.

IRVING MARCUS, *Primary Examiner*.

DUVAL T. McCUTCHEN, WALTER A. MODANCE, *Examiners*.